US006543986B2

(12) United States Patent
Springston et al.

(10) Patent No.: US 6,543,986 B2
(45) Date of Patent: Apr. 8, 2003

(54) APPARATUS WITH UPPER DISPLACEMENT MEMBER FOR HANDLING ARTICLES

(75) Inventors: Eric D. Springston, York, SC (US); John R. Pratt, Charlotte, NC (US); John Schoenma ker, Fort Mill, SC (US); Dale A. Williams, Fort Mill, SC (US)

(73) Assignee: Multi-Shifter, Inc., Charlotte, NC (US)

( * ) Notice: Subject to any disclaimer, the term of this patent is extended or adjusted under 35 U.S.C. 154(b) by 17 days.

(21) Appl. No.: 09/845,988

(22) Filed: Apr. 30, 2001

(65) Prior Publication Data

US 2001/0016159 A1 Aug. 23, 2001

Related U.S. Application Data

(62) Division of application No. 09/257,712, filed on Feb. 25, 2001, now Pat. No. 6,247,887.

(51) Int. Cl.[7] .......... B65G 65/02

(52) U.S. Cl. .......... 414/640; 414/642; 414/789.9; 414/796.2; 414/509; 187/233

(58) Field of Search .......... 414/640, 622, 414/623, 642, 641, 789.9, 790.2, 790.4, 796.2, 511, 509, 492, 643, 419, 786, 639; 187/233, 234

(56) References Cited

U.S. PATENT DOCUMENTS

| | | | | | |
|---|---|---|---|---|---|
| 2,613,829 | A | * | 10/1952 | Gault | 214/212 |
| 2,682,347 | A | * | 6/1954 | Jackson | 214/147 |
| 3,209,933 | A | * | 10/1965 | Barnes | 214/650 |
| 3,825,134 | A | * | 7/1974 | Stobb | 214/152 |
| 4,217,074 | A | * | 8/1980 | Leasor et al. | 414/642 |
| 4,395,189 | A | * | 7/1983 | Munten | 414/635 |
| 4,526,504 | A | * | 7/1985 | Hovey | 414/661 |
| 4,690,609 | A | | 9/1987 | Brown | |
| 4,859,136 | A | | 8/1989 | Burenga | |
| 4,921,075 | A | * | 5/1990 | Schumacher | 187/9 E |
| 4,963,070 | A | * | 10/1990 | Detrick | 414/492 |
| 5,096,367 | A | * | 3/1992 | Winski | 414/786 |
| 5,328,321 | A | * | 7/1994 | Moffett et al. | 414/631 |
| 5,478,196 | A | * | 12/1995 | Avitan et al. | 414/786 |
| 5,509,774 | A | | 4/1996 | Yoo | |
| 5,536,133 | A | | 7/1996 | Velez et al. | |
| 5,562,392 | A | * | 10/1996 | Raben | 414/608 |
| 6,241,449 | B1 | * | 6/2001 | Krooss | 414/419 |

* cited by examiner

*Primary Examiner*—Joseph A. Fischetti
(74) *Attorney, Agent, or Firm*—Kennedy Covington Lobdell & Hickman, LLP

(57) ABSTRACT

The present invention discloses either an apparatus that is adapted for selective mounting to and demounting from a pallet jack for use therewith or a transport vehicle having an apparatus permanently mounted thereto, which can effectively and efficiently transport articles or stacks of objects, such as boxes, furniture, trays, or the like from one location to another. The apparatus comprises a housing and an article engaging and lifting member, which includes a base and a back support member for supporting the article or stacks of objects. The article engaging and lifting member is pivotally mounted to the housing, preferably adjacent the bottom of the back support member. In one embodiment, the apparatus further includes a first clamp member for maintaining the article adjacent the back support member. In another embodiment, the apparatus further includes an upper displacement member which can engage and displace an upper object from the stack of objects to reduce the effective height of the tilted stack for transport. In another embodiment of the present invention, the base is linearly moveable along the back support member for raising and lowering articles along the length of the back support member. The base comprises a plurality of laminated forks or a laminated platen projecting outwardly from the back support member.

19 Claims, 8 Drawing Sheets

APPARATUS WITH UPPER DISPLACEMENT MEMBER FOR HANDLING ARTICLES

CROSS-REFERENCE TO RELATED APPLICATION

This application is entitled to the benefit of, and claims priority to, and is a division of U.S. patent application Ser. No. 09/257,712, now U.S. Pat. No. 6,247,887, filed Feb. 25, 2001 by Springston et al. and entitled "APPARATUS FOR HANDLING ARTICLES."

BACKGROUND OF THE INVENTION

The present invention relates broadly to devices for handling articles and, more particularly, to an apparatus that is removeably mountable onto a pallet jack for use therewith in lifting, tilting, transporting, and relocating articles, such as stacks of trays, boxes, furniture or the like from one location to another. A motorized truck having the maneuverability of a pallet jack and upon which the apparatus is permanently mounted is also contemplated within the scope of the present invention.

Many different types of material handling devices or trucks are known in the art. Such devices range from a simple hand truck to a more complex fork lift device. A hand truck requires the manual strength of the operator to assist in lifting, tilting, and maneuvering the load, which is supported on the hand truck on a relatively short platen base. Generally, a hand truck and operator are only capable of maneuvering a load of up to several hundred pounds. In contrast, a fork lift device is generally motorized, has a place for the operator to stand or sit, and is capable of lifting and transporting extremely heavy loads weighing up to several thousand pounds or more. In addition, a standard fork lift usually has fairly long and thick forks for lifting, supporting, and maneuvering heavy or bulky loads, such as palletized loads, industrial machines or equipment.

Specialized material handling trucks having capabilities falling somewhere between hand trucks and fork lifts are also known in the art. One example of such a device is shown in Avitan et al., U.S. Pat. No. 5,478,196, which discloses a small truck that is designed for loading, tilting, and transporting two stacks of interlocking bread trays in side-by-side fashion. Although most of the bread industry still uses hand trucks to load and unload stacks of bread trays from a truck trailer, the device in Avitan offers some benefits.

The device disclosed in Avitan, however, has numerous disadvantages, which, as will be seen, are overcome by the apparatus of the present invention. For example, in order to move stacks of bread as disclosed in Avitan, a bread manufacturer only has the option of purchasing the entire apparatus or truck described in the Avitan patent. Since most bread manufacturers own pallet jacks, there is a need to provide a material handling apparatus that can be mounted onto a pallet jack, which obviates the need for purchasing an entirely new transport vehicle upon which an apparatus is permanently mounted. In addition, the truck disclosed in Avitan has the operator facing away from the stacks of bread trays being loaded onto the truck—while this allows the operator to see clearly when driving the loaded truck in a forward direction, it is quite difficult for the operator to see while backing the truck into correct loading and unloading position. Further, the Avitan patent discloses a standard platen (solid or divided) for disposition beneath the stacks of bread trays to be moved. To fit beneath stacks of bread trays, the standard platen must be fairly thin, which tends to bend easily especially after repeated use. Another disadvantage of the Avitan design is having the pivot point of the tiltable upright approximately halfway up the height of the upright. The high pivot point creates at least two problems: first, since the lower half of the tilted stacks must tilt away from the truck, the operator must ensure that there is sufficient space on the other side of the stacks before the load is tilted; second, the high pivot point places the center of gravity of the load further toward the rear of the truck which decreases the stability of the loaded truck during transport. In addition, the Avitan device does not disclose a means or method for maintaining the stacks of bread trays in abutment with or adjacent to the tiltable upright during tilting or transport. In practice, when being tilted, the stacks of trays may actually lean away from the upright. Such leaning not only increases the lateral instability of the load being carried, but also increases the amount of force exerted on the platen during the tilting process, which, in turn, increases the likelihood that the platen will bend. Further, the truck disclosed in Avitan can only carry as many bread trays as will fit, while tilted, through the height of the opening of a truck trailer into which the stacks of bread trays are being loaded or unloaded. Further, the truck in the Avitan patent is limited to the handling of stacks of bread trays. There is no disclosure or suggestion to use the truck to transport other types of articles, such as furniture, boxes, or similar uniformly-shaped articles. Finally, there is no disclosure or suggestion that the truck have the capability of raising and lowering the articles being moved along the height of the upright to allow the articles to be loaded onto or unloaded from a raised platform or stack, nor is there any disclosure or suggestion that the platen or base have the capability of being adjusted in a side to side fashion to allow the base to be properly centered before loading the article or to allow the article to be side shifted relative to the upright after it has been loaded.

BRIEF SUMMARY OF THE INVENTION

It is therefore an object of present invention to provide an apparatus having a base and a back support member that can be selectively mounted and demounted to and from a pallet jack for use therewith in moving articles from one location to another.

It is a further object of the present invention to provide such a mountable apparatus with a pivot location generally at the bottom of the back support member.

It is also an object of the present invention to provide such a mountable apparatus with a first clamp member disposed along the upper half of the back support member for maintaining the articles in abutment with or adjacent the back support member during tilting and/or movement of the articles from one location to another.

It is another object of the present invention to provide such a mountable apparatus for use in moving stacks of objects that is capable of displacing at least one of the objects off of the stack whereby the vertical height of the tilted stack is reduced, which allows a stack of objects exceeding the vertical height restrictions of the opening of a truck trailer to be successfully loaded onto the truck trailer.

It is a further object of the present invention to provide such a mountable apparatus wherein the base may be raised and lowered along the height of the back support member to allow the articles being moved to be raised and lowered for loading onto or unloading from a raised platform.

It is a further object of the present invention to provide such a mountable apparatus wherein the base may be adjusted in side to side fashion relative to the back support member whereby the base may be properly centered below a load prior to loading and/or whereby the load may be properly adjusted across to the back support member after being loaded.

It is also an object of the present invention to provide such a mountable apparatus with a base comprising a plurality of laminated forks, each of such forks being selectively mountable and demountable onto the back support member and being tapered at one end for sliding under the articles to be moved.

Alternatively, it is an object of the present invention to provide such a mountable apparatus with a base comprising a laminated platen, mountable and demountable onto the back support member and being tapered at one end for sliding under the articles to be moved.

It is a further object of the present invention to provide such a mountable apparatus having each of and/or varying combinations of the above-mentioned novel features.

It is a further object of the present invention to provide a transport vehicle having each of and/or varying combinations of the above-mentioned novel features.

To that end, the present invention provides an apparatus for moving an article from one location to another, comprising a housing adapted for selective mounting to and demounting from a pallet jack, and an article engaging and lifting member attached to the housing and comprising a base for disposition beneath the article to be moved for bottom support thereof and a back support member extending from the base at a generally perpendicular orientation for side support of the article. The article engaging and lifting member is pivotally attached to the housing adjacent the bottom of the back support member to define a first pivot location. The apparatus further comprises means associated with the article engaging member and with the housing for tilting the article engaging and lifting member about the first pivot location. The tilting means comprises a force application member that either extends between and is connected to the housing and the back support member at a spacing from the first pivot location or connects to the housing and the article engaging and lifting member generally at the first pivot location whereby a force applied to the back support member by the force application member results in tilting movement of the article engaging and lifting member about the first pivot location.

In one embodiment of the present invention, the apparatus further comprises a first clamp member disposed on the back support member at a spacing from the first pivot location for engaging the article to be moved and maintaining the article adjacent the back support member. The first clamp member comprises at least one hook member pivotally mounted to the back support member for pivotal movement into and out of clamping engagement with the article to be moved. In addition, the first clamp member may be vertically adjusted along the back support member to accommodate different types or sizes of articles or objects being moved.

In another embodiment of the present invention, when the article being moved is a stack of objects, the apparatus further comprises an upper displacement member mounted to the back support member which engages an upper object of the stack and displaces the upper object off of the stack over the back support member whereby the vertical height of the tilted stack is reduced. The upper displacement member comprises a rack mounted at a top of the back support member and having a length extending generally perpendicular to the back support member in a direction opposite that of the base; and an upper engagement member moveably mounted on the rack for engaging, lifting, and moving the upper object along the length of the rack. The upper engagement member comprises a beam member movably mounted along the length of the rack, an engagement plate defining a plurality of openings therein and moveably mounted to the beam member for vertical and horizontal movement relative to the upper object, a second clamp member mounted to the beam member and adapted to project through one of the plurality of openings of the engagement plate and to engage and stabilize the upper object relative to the engagement plate, and a plurality of lifting fingers mounted to the engagement plate and projecting through others of the openings in the engagement plate, the lifting fingers engaging a side of the upper object during vertical movement of the engagement plate for lifting the upper object from the stack and pulling the upper object along the length of the rack in response to movement of the beam member.

In another embodiment of the present invention, the base is linearly moveable along the back support member for raising and lowering of the article relative to the back support member. In addition, the base may also be adjustable in side to side or horizontal fashion relative to the back support member.

In one embodiment, the base comprises a plurality of forks projecting outwardly in side by side, spaced relation from the back support member for disposition beneath the article for support thereof Preferably, the forks are laminated for increased strength and the thickness of each fork tapers on the end furthestmost from the back support member to more easily slide beneath an article being loaded. Alternatively, the base comprises a platen projecting outwardly from the back support member for disposition beneath the article for support thereof. Preferably, the platen is laminated for increased strength and the thickness of the platen tapers on the end furthestmost from the back support member to more easily slide beneath an article being loaded.

It is contemplated within the scope of the present invention that any of the above features may be used singly or in combination with each other. Further, it is contemplated within the scope of the present invention, that any one or combination of the above features could be permanently or fixedly mounted on a transport vehicle, which would provide the same functionality as an apparatus selectively mounted to and demountable from the pallet jack.

By the above, the present invention provides either an apparatus that is adapted for selective mounting to and demounting from a pallet jack for use therewith or a transport vehicle having an apparatus described herein permanently mounted thereto, either of which can effectively and efficiently transport articles or stacks of objects, such as boxes, furniture, trays, or the like from one location to another.

DESCRIPTION OF THE PREFERRED EMBODIMENT

Figure 1:
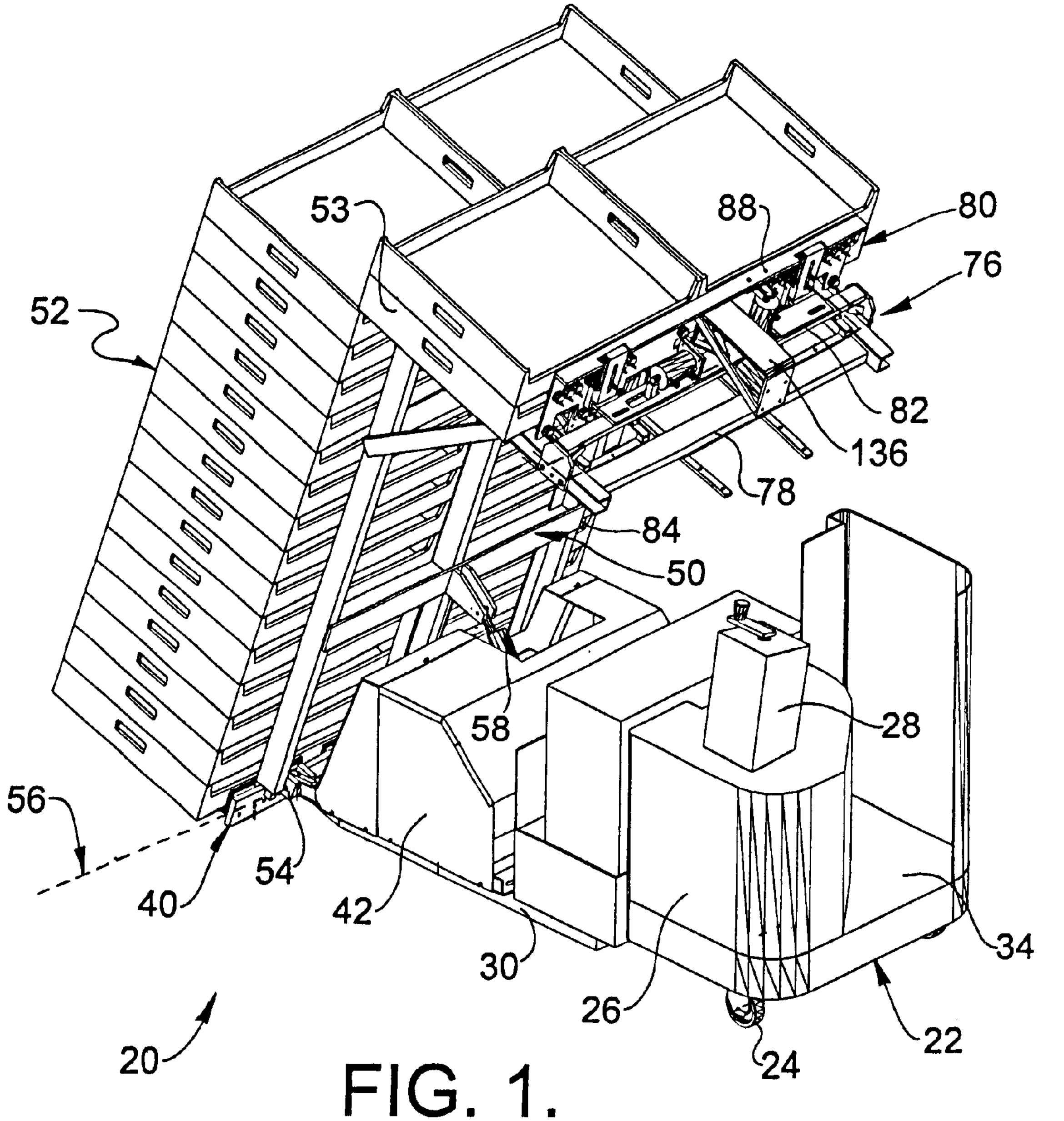
FIG. 1 is a rear, perspective view of one embodiment of the present invention wherein the apparatus is mounted to a pallet jack.
Figure 2:
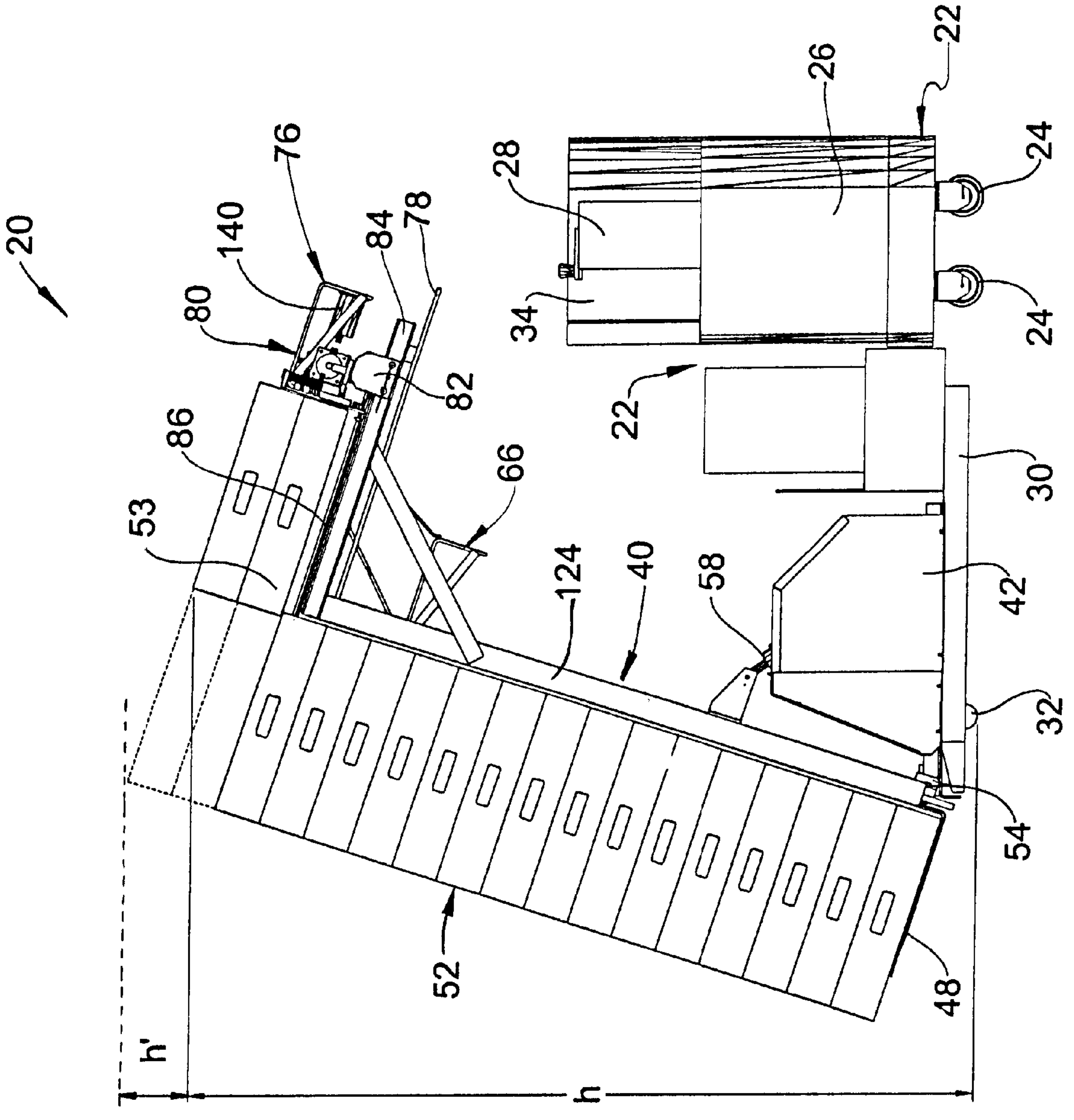
FIG. 2 is a side view of the apparatus and pallet jack shown in FIG. 1.

Turning now to the drawings and more particularly to FIGS. 1 and 2, a device for handling articles, and in this embodiment a stack of objects such as bread trays, is illustrated generally at 20. The device 20 consists of an apparatus 40 mounted onto a standard pallet jack 22. The pallet jack 22 is conventional and will, therefore, be described only in limited detail. The pallet jack 22 has wheels 24, a power unit 26, operator controls 28, and two pallet forks 30 for carrying a load of pallets (not shown). Each pallet fork 30 has wheels 32 at one end thereof and is usually capable of being raised and lowered a limited distance from the floor for raising and lowering a load of pallets. Conveniently, the pallet jack 22 also has an area 34 for the operator to stand or sit in sideways fashion, which makes it easy for the operator to see when driving the pallet jack 22 in either direction and when loading material onto or unloading material from the apparatus 40.

Rather than being used to carry a load of pallets, the pallet jack 22 may be used, as disclosed in the present invention, as a transport vehicle upon which the apparatus 40 may be mounted and which, in conjunction with the apparatus 40, may be used to engage, lift, tilt, transport, and otherwise relocate articles, such as boxes, trays, furniture, or the like.

Figure 9:
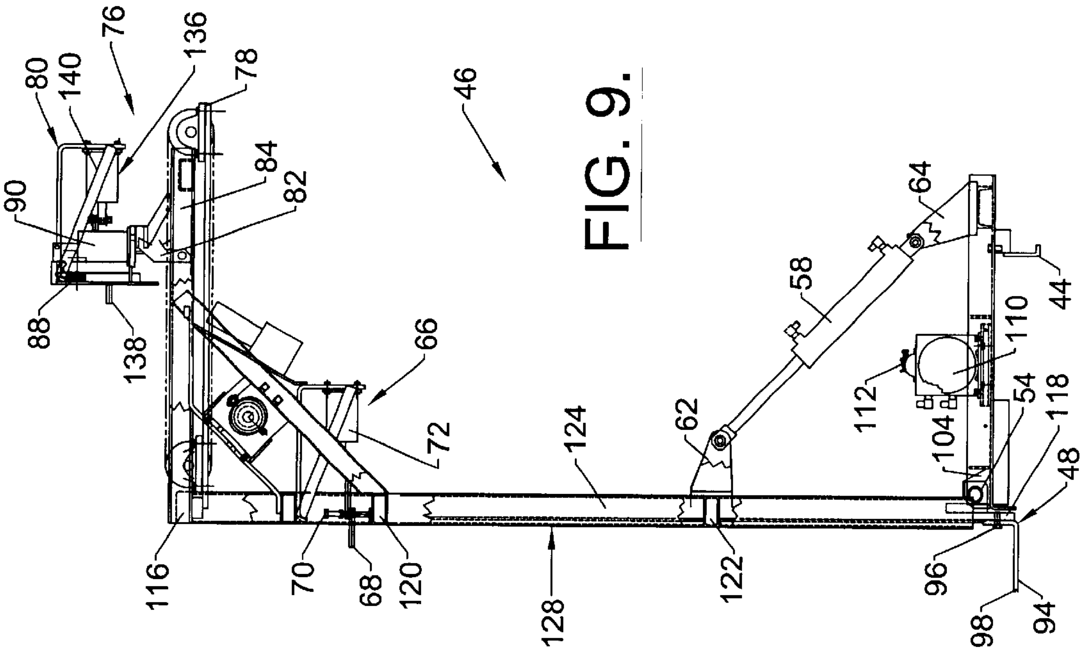
FIG. 9 is a side view of the apparatus shown in FIG. 8.
Figure 8:
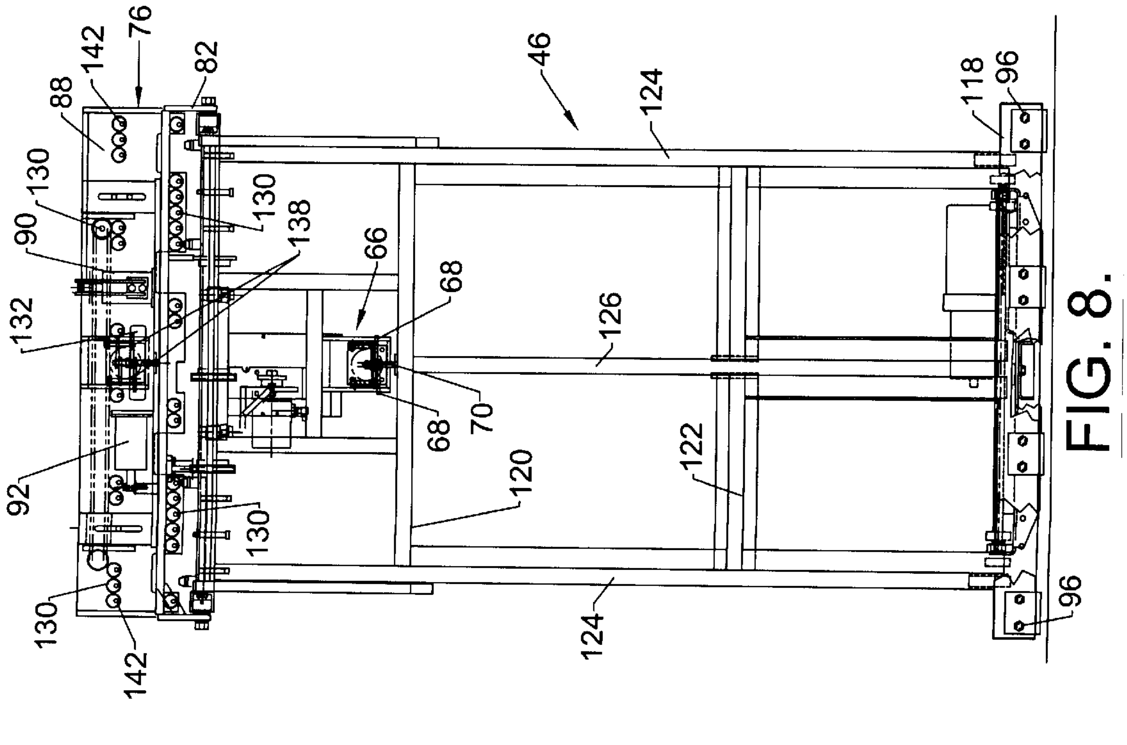
FIG. 8 is a front view of the apparatus shown in FIG. 3B.
Figure 11:
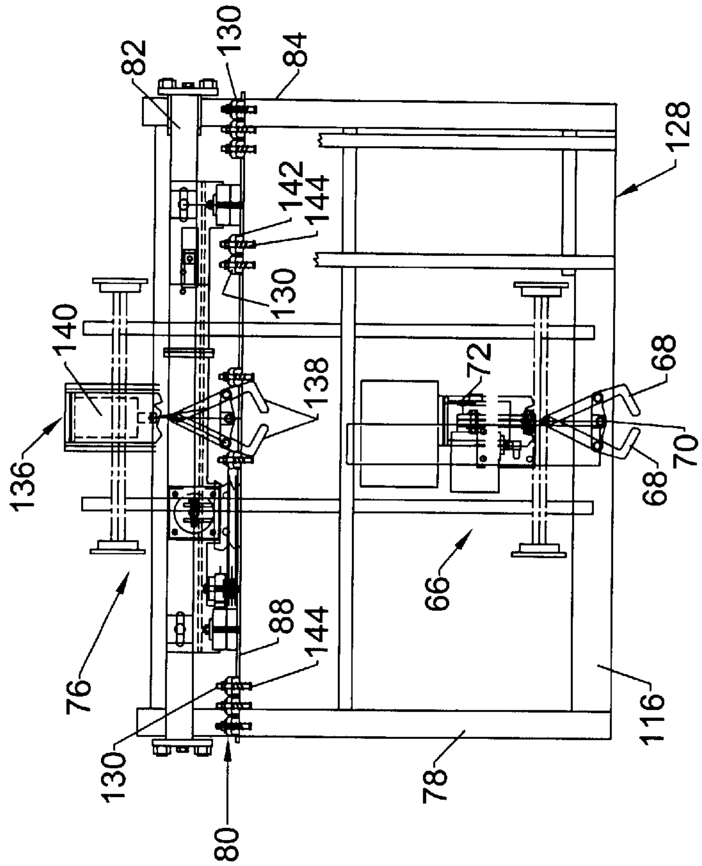
FIG. 11 is a partial top view of the upper portion of the apparatus shown in FIG. 8.
Figure 10:
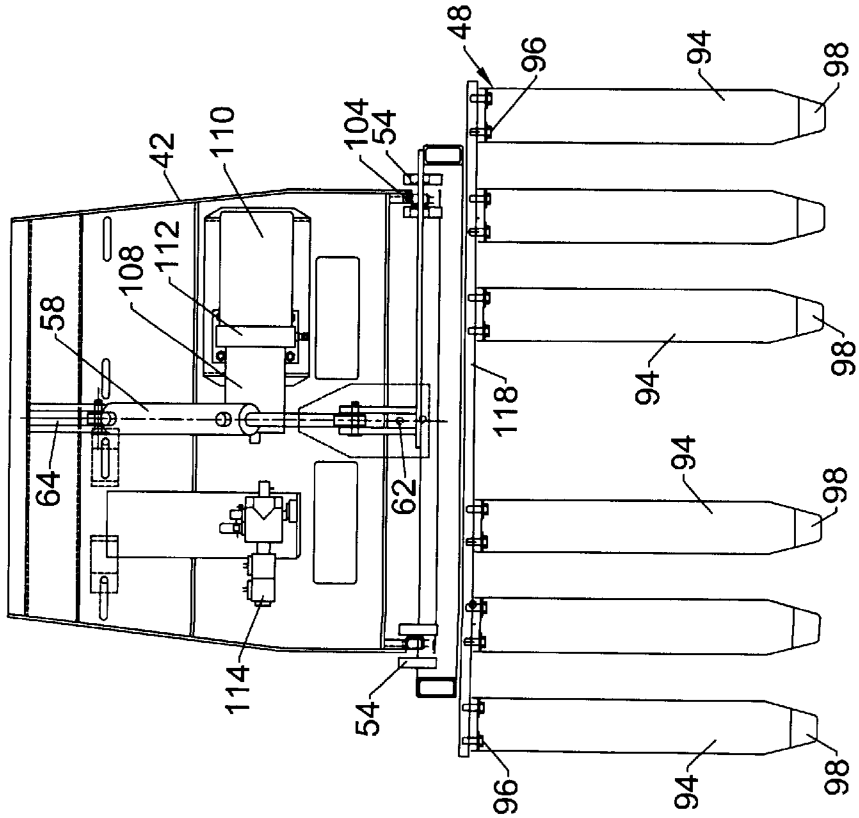
FIG. 10 is a partial top view of the lower portion of the apparatus shown in FIG. 8.

The apparatus 40 includes a housing 42 adapted for selective mounting and demounting onto the pallet jack 22. More specifically, in the preferred embodiment, the housing 42 is mounted onto the pallet forks 30 of the pallet jack using C-shaped or L-shaped clamps 44 (see FIGS. 7, 9, and 13) or similar vise-like devices that may be screwed or bolted into locking contact with the pallet forks 30. Alternatively, any other suitable means for detachably clamping or mounting the housing 42 to the pallet forks 30 may be used.

Referring to FIGS. 1, 2, 3A, 3B, and 3C, the apparatus 40 also includes an article engaging and lifting member 46, which in its simplest configuration, includes a base 48 and a back support member 50, which are positioned in generally perpendicular relation to one another. The base 48 is used to support the bottom of the stack of objects and the back support member 50 is used to support one side of the stack when tilted. As shown, the article engaging and lifting member 46 is pivotally attached to the housing 42 in conventional manner using pivot brackets 54. In the preferred embodiment, the pivot location 56 is generally at or adjacent the bottom or base of the back support member 50; however, a higher pivot location could also be used.

The article engaging and lifting member 46 is tilted about the pivot location 56 in response to force applied by a force application member 58. In the preferred embodiment, the force application member 58 is a hydraulically-driven piston/cylinder combination. Alternatively, the force application member 58 could be a pneumatically-driven piston/cylinder combination, a geared crank, or any other type of mechanical assembly that performs a similar function. One end of the force application member 58 connects with a pivot bracket 62 along the height of the back support member 50. Preferably, the pivot bracket 62 is spaced a predetermined distance above the pivot location 56 on the back side of the back support member 50. As shown more fully in FIGS. 7, 9, and 13, the other end of the force application member 58 mounts to a pivot bracket 64 within the housing 42.

Although not shown in any of the drawings, the force application member 58 could alternatively be in the form of a hydraulic or electric rotator, which is known in the art. In such a case, the rotator could be positioned generally at or near the pivot location 56.

Referring back to FIG. 2, a first clamp member 66 is disposed on the back support member 50 at a predetermined distance above the pivot location 56. As will be discussed in greater detail hereinafter, the first clamp member 66 is used to engage one or more articles and to maintain the article or stack of objects 52 in abutment with or adjacent to the back support member 50. The first clamp member 66 assists in stabilizing the load not only during tilting but also during transport, including turning maneuvers.

An upper displacement member 76 is mounted at the top of the back support member 50. As will be discussed in greater detail hereinafter, the upper displacement member 76 engages at least one of the upper objects 53 in the stack of objects 52 and displaces the upper object 53 and any objects resting on top of the upper object a predetermined distance off of the stack. As shown graphically in FIG. 2, and for reasons that will be discussed hereinafter, displacing one or more of the upper objects 53 off of the stack 52 reduces the effective height of the tilted stack of articles from a height of h+h' to a height of only h.

Figures 3, 3A, 3B, 3C:
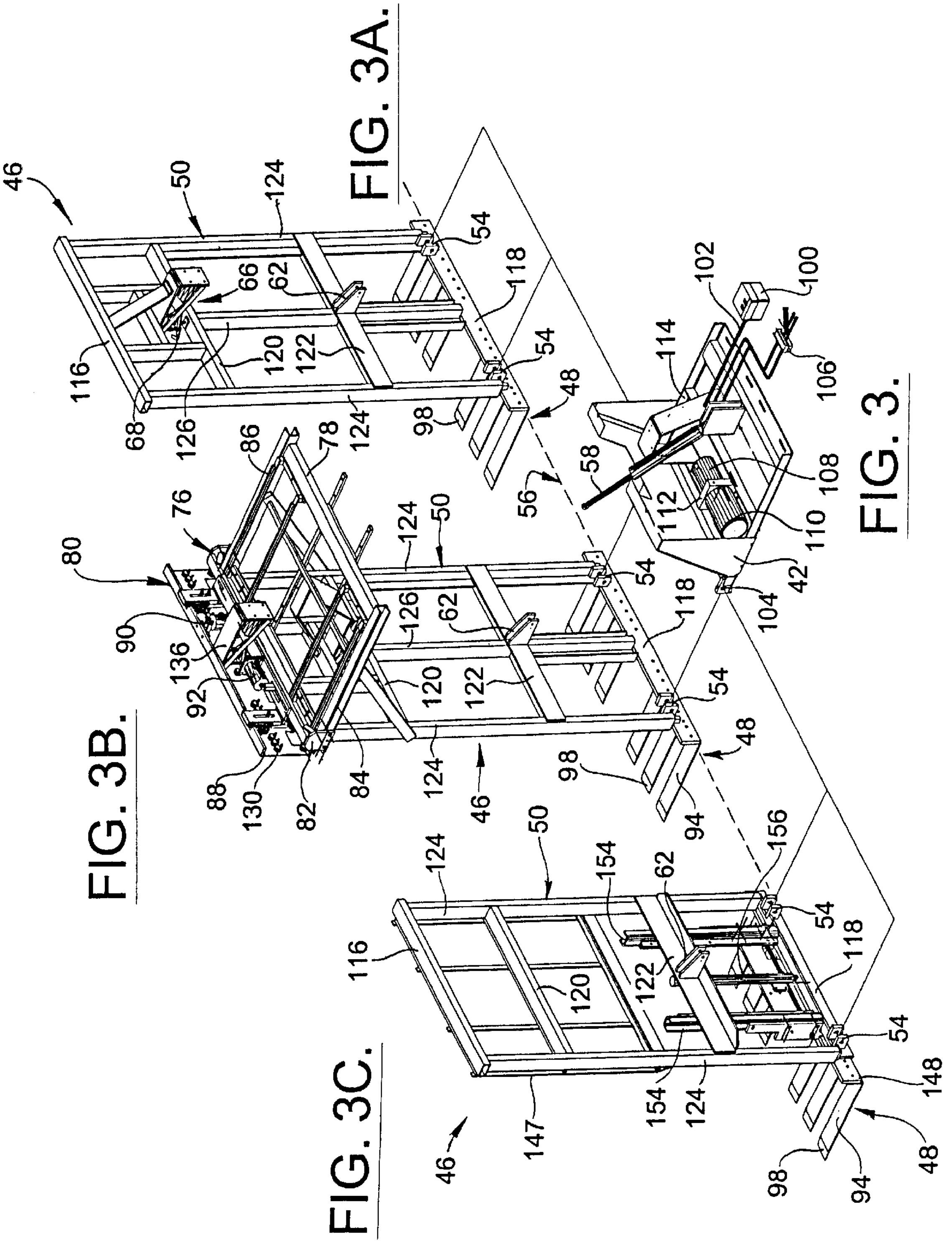
FIG. 3 is a rear, perspective view of the internal components of the housing portion of the apparatus shown in FIG. 1.
FIG. 3A is a rear, perspective view of one embodiment of the apparatus of the present invention.
FIG. 3B is a rear, perspective view of the apparatus shown in FIG. 1.
FIG. 3C is a rear, perspective view of another embodiment of the apparatus of the present invention.

FIG. 3 illustrates the main components contained within housing 42 and FIGS. 3A, 3B, and 3C illustrate three embodiments of the article engaging and lifting member 46. The housing 42 contains the piston/cylinder combination 58, controls 100 which are used by the operator to maneuver the article engaging and lifting member 46, a control line 102 which connects the controls 100 electrically with the article engaging and lifting member 46, and pivot mounting members 104 for connecting to pivot brackets 54 on the article engaging and lifting member 46. The housing 42 also contains a power splice block 106, which provides electrical power from the pallet jack battery (not shown) to the apparatus power pack 110. The apparatus power pack 110 includes a DC motor 108, which drives a hydraulic pump 112. In response to input at controls 100, the DC motor 108, the hydraulic pump 112, and a plurality of selector solenoid valves 114 control the hydraulics used by the article engaging and lifting member. The hydraulics include the force application member 58 and the other piston/cylinder combinations described herein.

Figure 7:
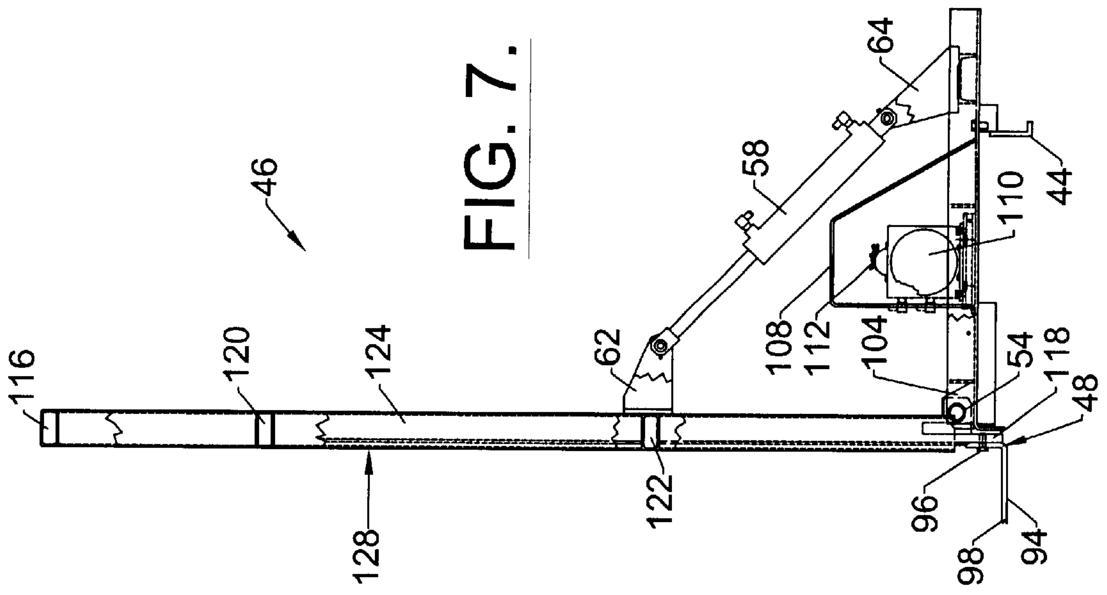
FIG. 7 is a side view of the apparatus shown in FIG. 6.
Figure 6:
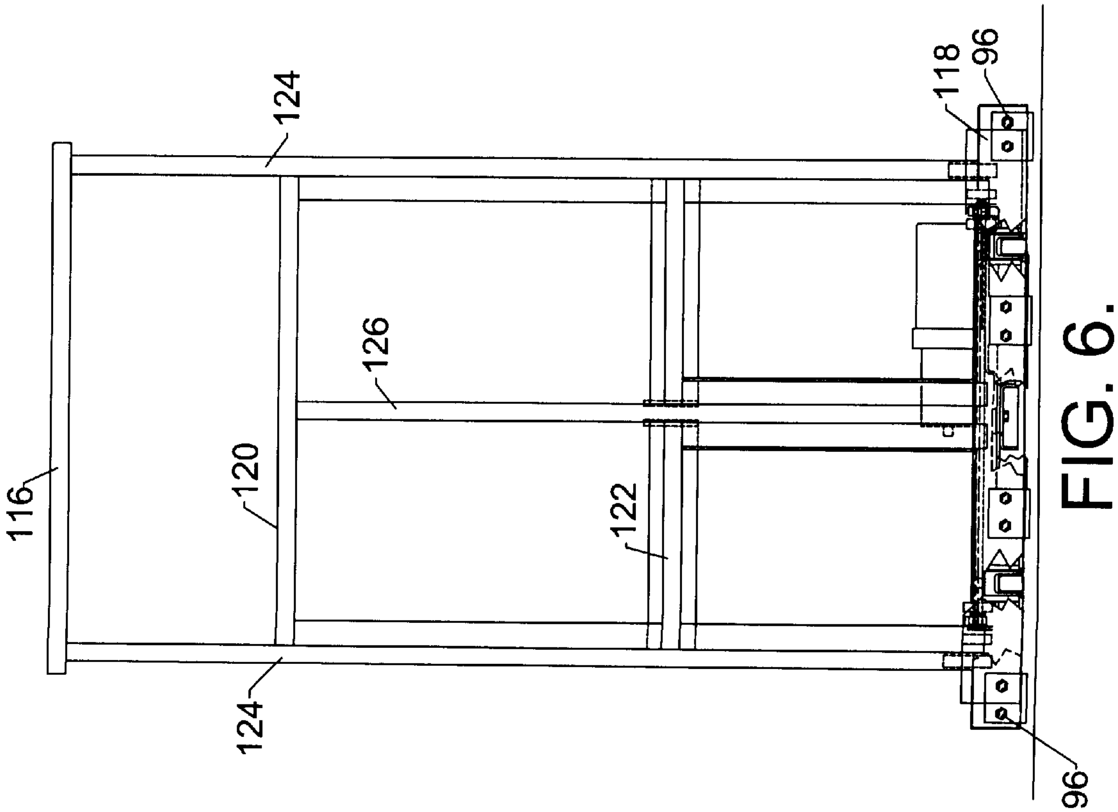
FIG. 6 is a front view of the apparatus shown in FIG. 3A.

FIGS. 3A, 6, and 7 illustrate one embodiment of the article engaging and lifting member 46. Preferably, the back support member 50 is rectangularly-shaped and, for ease of reference, has four horizontal beams: a top 116, a bottom 118, a first middle 120 and a second middle 122, and several vertical beams: two side 124 and one middle 126, extending between the bottom 118 and first middle horizontal 120 beams. The pivot brackets 54 are mounted in spaced relation on the back side of the bottom horizontal beam 118. The force application member pivot bracket 62 is mounted on the back side at the intersection of the second middle horizontal beam 122 and the middle vertical beam 126.

The first clamp member 66, as illustrated best in FIGS. 4, 8, 9, and 11 (which refer to another embodiment), is mounted between the top beam 116 and first middle horizontal beam 120. The first clamp member 66 includes at least one hook member 68, which is pivotally mounted to a post 70 mounted on the first middle horizontal beam 120. In the preferred embodiment, two hook members 68 are pivotally mounted in facing relation. The hook members 68 pivot into and out of clamping engagement with the article being moved in response to the extension and retraction of a hydraulically-driven piston/cylinder combination 72. The piston/cylinder combination 72 is controlled by solenoid valves 114 when activated by the operator using controls 100. The first clamp member 66 is vertically adjustable along post 70 to enable it to accommodate different sized or types of articles being moved. In addition, the first clamp member 66 is vertically spring-loaded to give it some flexibility when engaging the article being moved. The first clamp member 66 maintains the article being moved in abutment with or adjacent the front side of the back support member 50.

Figure 5:
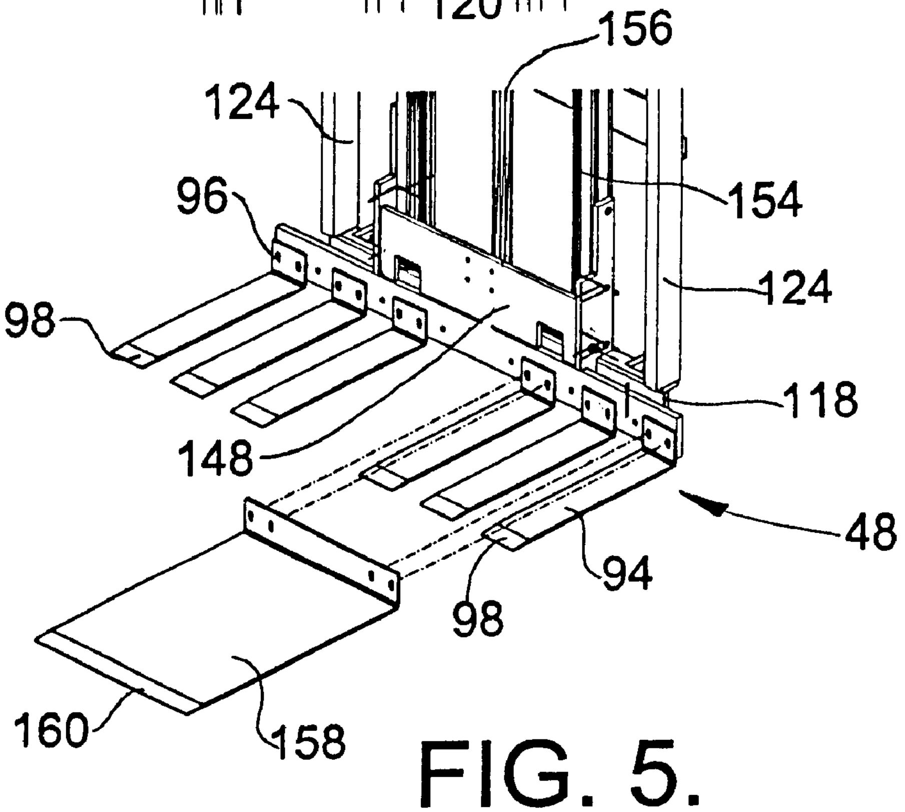
FIG. 5 is a front, partial perspective view of the lower portion of the apparatus shown in FIG. 3C.

Referring also to FIG. 5, the base 48 is mounted on the front side of the bottom horizontal beam 118. The base 48 consists of a plurality of laminated forks 94 projecting outwardly in side-by-side, spaced relation. Each laminated fork 94 is separately mounted to the bottom horizontal beam 118 using bolts 96 or other appropriate fastening means. The tip 98 of each laminated fork 94 is tapered for ease in sliding under the article or stack of objects being moved. Alternatively, the base 48 may include one or more laminated platens 158 mounted in similar fashion to the laminated forks 94 and having a similar taper at the tip 160 of each platen 158 for ease in sliding under the article to be moved. Being laminated increases the strength and load capability of the forks 94 or platens 158 and having the tapered tip allows the forks 94 or platens 158 to slide more easily beneath the article or stack of objects 52, even when they are lying flat on the floor or other work surface.

Figure 4:
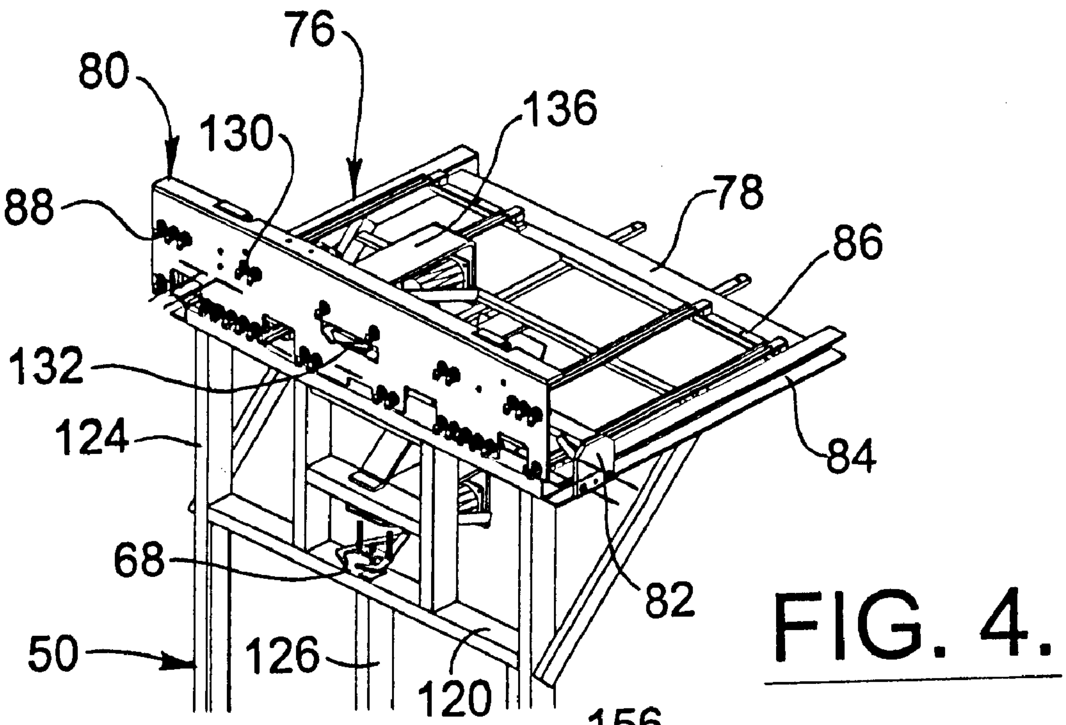
FIG. 4 is a front, partial perspective view of the upper portion of the apparatus shown in FIG. 3B.

FIGS. 3B, 8, 9, 10, and 11 illustrate another embodiment of the article engaging and lifting member 46. This embodiment is essentially the same as the embodiment described in FIG. 3A with the addition of the upper displacement member 76, as shown in FIGS. 1, 2, and 4. The upper displacement member 76 includes a substantially rectangular rack 78 mounted to top horizontal beam 116. The rack 78 has a length that extends generally perpendicularly from the back side of the back support member 50 in a direction opposite that of the base 48. The upper displacement member 76 also includes an upper engagement member 80 which is moveably mounted on the rack 78. The upper engagement member 80 is shown in engagement position in FIGS. 3B and 4 and in displacement position in FIG. 9.

The upper engagement member 80 includes a beam member 82 that spans across the width of the rack 78 and which is moveably mounted within channels 84 along the outside length of the rack 78. The beam member 82 is driven by a motorized sprocket and chain assembly 86, which is connected to the apparatus power pack 10 and which is controlled by the operator using the controls 100. A rack and pinion gear or similar assembly known in the art could be substituted for the sprocket and chain assembly 86.

The upper engagement member 80 further includes an engagement plate 88, which is mounted to the beam member 82. When in engagement position, the front surface 128 of the engagement plate 88 is substantially in alignment with and an extension of the front side of the back support member. The engagement plate 88 is moveably mounted on the beam member 82 and moves vertically in response to the extension and retraction of a lift piston/cylinder combination 90 and moves horizontally in response to the extension and retraction of side shift piston/cylinder combination 92. In combination, rack and pinion gears and a sprocket and chain assembly ensure that the engagement plate 88 moves uniformly in the vertical and horizontal directions when driven by the piston/cylinder combinations 90, 92. As can be seen more clearly in FIGS. 4 and 8, the engagement plate 88 has a number of openings therein, including a large rectangular opening 132 near the center of the engagement plate and a plurality of round openings 130 arranged in two horizontal rows.

The upper engagement member 80 further includes a second clamp member 136, functionally and structurally similar to the first clamp member 66, which is mounted to the beam member 82 behind the engagement plate 88. The hook members 138 of the second clamp member 136 are adapted to pivot through the rectangular opening 132 in the engagement plate 88 and into and out of clamping engagement with the upper object 53 being moved in response to the extension and retraction of a hydraulically-driven piston/cylinder combination 140. Like piston/cylinder combination 72 of the first clamp member 66, the piston/cylinder combination 140 of the second clamp member 136 is controlled by solenoid valves 114 when activated by the operator using controls 100. The second clamp member 136 is vertically adjustable on beam member 82 to enable it to accommodate different sized or types of articles being moved. In addition, the second clamp member 136 is vertically spring-loaded to give it some flexibility when engaging the article being moved. The second clamp member 136 maintains the article being displaced in abutment with or adjacent the front side of the engagement plate 88.

The upper engagement member 80 also includes a plurality of lifting fingers 142, which are mounted to and through the plurality of round openings 130 in the engagement plate 88. The projecting end 144 of each lifting finger 142 preferably has an upwardly-disposed lip (not shown) for engaging a side of the upper object 53 when the engagement plate 88 is moved vertically upwards. In addition, each lifting finger 142 is separately spring-biased not only to maintain each lifting finger 142 in a fully-extended position through the openings 130 prior to engagement with the side of the upper object 53 but also to allow each lifting finger 142 to retract as necessary when engaging the side of the upper object. In this manner, the lifting fingers 142 may engage a side of the upper object 53 that has an uneven surface or a surface that is not uniformly distant from the engagement plate 88.

The engagement plate 88 may be shifted horizontally in either direction by the operator, if necessary, to facilitate engagement with the upper object 53 by the second clamp member 136 or by the lifting fingers 142.

Figure 13:
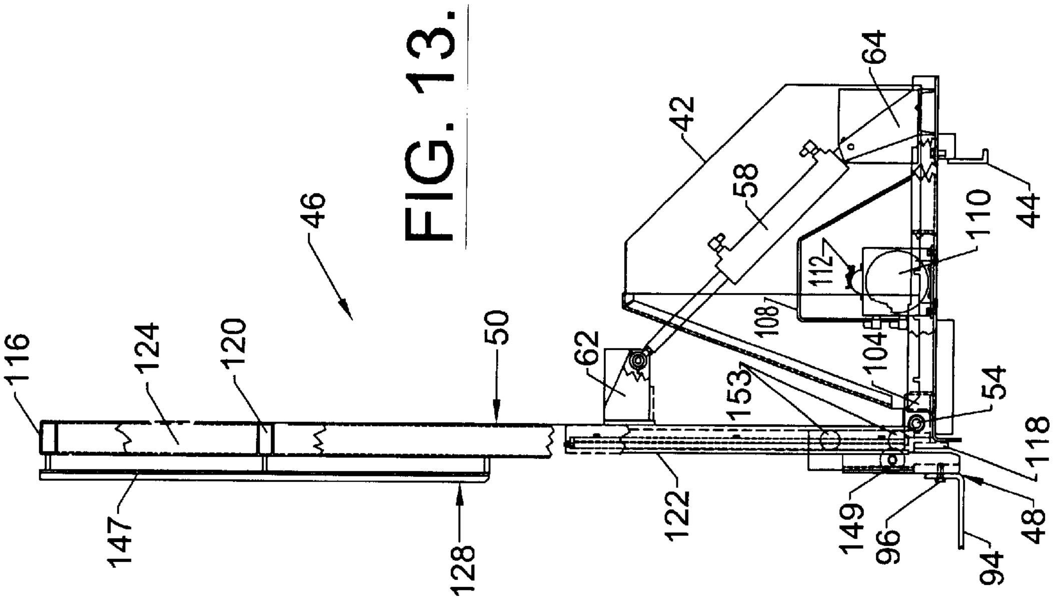
FIG. 13 is a side view of the apparatus shown in FIG. 12.
Figure 12:
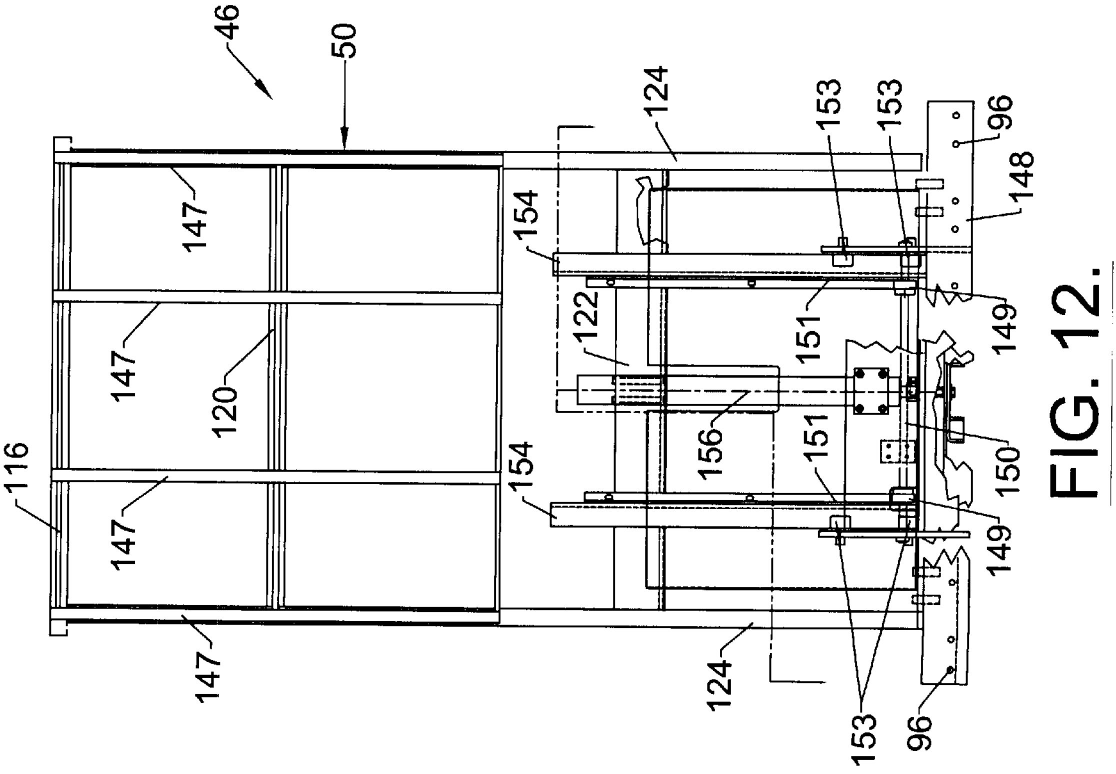
FIG. 12 is a front view of the apparatus shown in FIG. 3C.

FIGS. 3C, 12, and 13, illustrate another embodiment of the article engaging and lifting member 46, with some modifications that allow the base 48 of the article engaging and lifting member 46 to raise and lower along the length of the back support member 50. This, in turn, allows articles to be loaded onto or unloaded from a raised platform. In addition, because the base 48 in this embodiment actually extends a slight distance in front of the back support member 50, it is necessary to mount a backguard slide 147 onto the front surface of the back support member 50 to create a substantially flat abutment surface for the article being moved.

In this embodiment, the laminated forks 94 or laminated platen 158 are mounted onto carriage 148. Carriage 148 is moveably mounted to the back support member 50 for vertical movement along a portion of the height of the back support member 50. The carriage 148 moves in response to force applied by carriage lift piston/cylinder combination 156, which causes the carriage 148 and, correspondingly, the base 48 to raise and lower as desired by the operator.

Load equalization is achieved by attaching the carriage 148 to a rack and pinion system. More specifically, the carriage is mounted to an equalization rod 150. On both ends of the equalization rod 150 are mounted pinions 149, which are aligned with each other and welded or otherwise permanently attached to rod 150. Each pinion 149 travels along its own rack 151, which are also aligned with each other. Finally, two pair of rollers 153 are mounted to the carriage 148 and placed within guide rails or channels 154. The pair of rollers 153 maintain the base 48 in perpendicular relationship with the back support member 50 and the rack and pinion system maintains load equalization even when the load is not centered or equally balanced on the base 48.

Although not shown, a piston/cylinder combination may be easily added to the embodiment shown in FIG. 3C to allow the carriage 148, and thus the base 48, to have the capability of being adjusted in a side to side fashion by the operator. Side to side adjustment would allow the operator to shift the base 48 slightly as necessary to center the base 48 beneath an article being loaded. In addition, side to side shift would also allow the operator to adjust the base and the loaded article relative to the back support member 50 after the article has been loaded onto the base 48.

In addition, it is contemplated within the scope of the present invention that the features described in FIGS. 3A, 3B, and 3C may be used singly or in any combination together as dictated by the needs of different industries and applications.

In practice, with each of the embodiments described herein, the apparatus 40 is first mounted to the forks 30 of the pallet jack 22. The apparatus power pack 108 is then connected to the battery of the pallet jack using the power splice block 106. Next, the operator maneuvers the pallet jack 22 with the mounted apparatus 40 into position for engagement of the articles or stack of objects to be moved. The pallet jack forks 30 are lowered completely and the article engaging and lifting member 46 is tilted slightly forward (a few degrees only) toward the article or stack of objects by the force application member 58 causing the base 48 to be in sliding contact with the floor. The pallet jack 22 then moves forward until the base 48 has slid under the article or stack of objects and the back support member 50 is adjacent or in close proximity with the article or stack of objects.

In the embodiment shown in FIG. 3A, the first clamp member 66 engages the article or stack of objects. The article engaging and lifting member 46 is then tilted back toward the housing 42 approximately 20 degrees. With the load secure, the operator drives the pallet jack to the necessary unloading location and reverses the above process to unload the article or stack of objects.

In the embodiment shown in FIG. 3B, the first clamp member 66 engages the stack of objects to be moved. The upper engagement member 80 of the upper displacement member 76 is then brought into engagement position adjacent the stack of objects whereby the lifting fingers 142 are substantially in contact with the side of the upper object 53. The engagement plate 88 is then raised vertically, which causes the lifting fingers 142 to slightly lift the upper object 53 from the stack of objects 52. The second clamp member 136 next engages the upper object 53 to maintain the upper object 53 adjacent the engagement plate 88. The article engaging and lifting member 46 is the tilted back toward the housing 42 approximately 20 degrees. With the load secure, the operator drives the pallet jack to the necessary unloading location and reverses the above process to unload the article or stack of objects. The act of displacing the upper objects 53 reduces the effective height of the tilted load sufficiently to allow the operator to place the load onto a truck having an opening clearance of a height only slightly greater than h but with a storage area of at least h+h'. When reversing the unloading process, the engagement plate may be shifted slightly in either horizontal direction to accommodate any lateral displacement between the stack of objects 52 supported by the base 48 and the upper objects 53 supported by the upper displacement member 76; thus, allowing the upper objects to be properly stacked back on the stack of objects.

In the embodiment shown in FIG. 3C, the base 48 may be raised or lowered or side shifted as necessary when loading or unloading the article or stack of objects being moved. The base 48 may be raised or lowered or side shifted before or after the article and engaging member 46 has been tilted for transport.

With all of the above embodiments, the operator riding on the pallet jack in area 34 controls the pallet jack using controls 28 and controls the various functions of the apparatus 40 using controls 100.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. An apparatus for moving a stack of objects from one location to another, comprising:

a transport vehicle;

a stack engaging and lifting member pivotally attached to said transport vehicle at a pivot location and comprising a base for disposition beneath the stack to be moved for bottom support thereof and a back support member extending from said base at a generally perpendicular orientation for side support of the stack;

means associated with said stack engaging and lifting member and said transport vehicle for tilting said stack engaging and lifting member about said pivot location; and an upper displacement member, mounted to said back support member for reciprocating movement relative thereto, which engages an upper object of the stack and temporarily displaces the upper object off of the stack over said back support member whereby the vertical height of the tilted stack is temporarily reduced.

2. An apparatus according to claim 1, wherein said upper displacement member comprises:

a rack mounted at a top of said back support member and having a length extending generally perpendicular to said back support member in a direction opposite that of said base; and an upper engagement member moveably mounted on said rack for engaging, lifting, and moving the upper object along said length of said rack.

3. An apparatus according to claim 2, wherein said upper engagement member comprises:

a beam member movably mounted along said length of said rack;

an engagement plate defining a plurality of openings therein and moveably mounted to said beam member for vertical and horizontal movement relative to the upper object;

a second clamp member mounted to said beam member and adapted to project through one of said plurality of openings of said engagement plate and to engage and stabilize the upper object relative to said engagement plate; and a plurality of lifting fingers mounted to said engagement plate and projecting through others of said openings in said engagement plate, said lifting fingers engaging a side of the upper object during vertical movement of said engagement plate for lifting the upper object from the stack and pulling the upper object along said length of said rack in response to movement of said beam member.

4. An apparatus according to claim 1, wherein said tilting means comprises a force application member extending between and connected to said transport vehicle and said back support member at a spacing from said pivot location whereby a force applied to said back support member by said force application member results in tilting movement of said article engaging and lifting member about said pivot location.

5. An apparatus according to claim 1, wherein said tilting means comprises a force application member connected to said transport vehicle and said article engaging and lifting member generally at said pivot location whereby a force applied to said back support member by said force application member results in tilting movement of said article engaging and lifting member about said pivot location.

6. An apparatus according to claim 1, wherein said pivot location is located adjacent the bottom of said back support member.

7. An apparatus according to claim 6, wherein said base is linearly moveable along said back support member for raising and lowering of the stack relative to said back support member.

8. An apparatus according to claim 1, wherein said base is linearly moveable along said back support member for raising and lowering of the article relative to said back support member.

9. An apparatus according to claim 1, wherein said base is adjustable in side to side fashion relative to said back support member.

10. An apparatus according to claim 1, wherein said base comprises a plurality of laminated forks projecting outwardly in side by side, spaced relation from said back support member for disposition beneath the article for support thereof.

11. An apparatus according to claim 10, wherein the thickness of each of said laminated forks tapers on the end furthestmost from said back support member.

12. An apparatus according to claim 1, wherein said base comprises a laminated platen projecting outwardly from said back support member for disposition beneath the article for support thereof.

13. An apparatus according to claim 12, wherein the thickness of said laminated platen tapers on the end furthestmost from said back support member.

14. A low-profile apparatus for moving a stack of objects from one location to another, comprising:

a transport vehicle;

a stack engaging and lifting member pivotally attached to the transport vehicle at a pivot location and comprising a base for disposition beneath the stack to be moved for bottom support thereof and a back support member extending from the base at a generally perpendicular orientation for side support of the stack;

means associated with the stack engaging and lifting member and the transport vehicle for tilting the stack engaging and lifting member about the pivot location; and an upper displacement member mounted to the stack engaging and lifting member at the top of the back support member for reciprocating movement relative thereto, wherein the upper displacement member may be adjusted between at least two deployment states while the stack engaging and lifting member is tilted, wherein the deployment states include:

a first state wherein the upper displacement member is generally aligned with the back support member to maintain an object on the top of the stack, wherein the uppermost point on the upper displacement member while deployed in the first state defines a first elevation; and a second state wherein the upper displacement member is retracted from the back support member to temporarily reposition the object at least partially behind the top of the back support member, wherein the vertical height of the upper displacement uppermost point on the upper displacement member while deployed in the second state defines a second elevation;

whereby the first elevation is higher than the second elevation.

15. The apparatus of claim 14, wherein the upper displacement member comprises:

a rack mounted at the top of the back support member and having a length extending generally perpendicular to the back support member in a direction opposite that of the base; and an upper engagement member moveably mounted on the rack for engaging, lifting, and moving the object along the length of the rack.

16. The apparatus of claim 15, further comprising a force application member connected to the upper engagement member whereby a force applied to the upper engagement member by the force application member causes the temporarily repositioned object to return to the top of the stack.

17. An apparatus for moving a stack of objects from one location to another, comprising:

a transport vehicle;

a stack engaging and lifting member pivotally attached to the transport vehicle at a pivot location and comprising a base for disposition beneath the stack to be moved for bottom support thereof and a back support member extending from the base at a generally perpendicular orientation for side support of the stack;

means associated with the stack engaging and lifting member and the transport vehicle for tilting the stack engaging and lifting member about the pivot location; and an object support assembly, mounted to the stack engaging and lifting member at the top of the back support member for reciprocating movement relative thereto, for temporarily shifting an object from the top of the stack and subsequently returning the temporarily shifted object to the top of the stack, the object support assembly including a support surface for providing bottom support for the temporarily shifted object and an engagement member for moving the object on the support surface.

18. The apparatus of claim 17, wherein the object support assembly includes a force application member connected to the engagement member whereby a force applied to the engagement member by the force application member causes the temporarily shifted object to return to the top of the stack.

19. The apparatus of claim 17, wherein the height of the apparatus when the stack engaging and lifting member is tilted and the object is temporarily shifted from the top of the stack is lower than the height of the apparatus when the stack engaging and lifting member is tilted and the object is returned to the top of the stack.

* * * * *